Oct. 9, 1956

F. L. BOYD 2,766,026

FOAM DISCHARGE UNIT

Filed July 22, 1952

INVENTOR.
FISHER L. BOYD
BY
*Lew Edelson*
ATTORNEY

Oct. 9, 1956
F. L. BOYD
2,766,026
FOAM DISCHARGE UNIT
Filed July 22, 1952
3 Sheets-Sheet 2
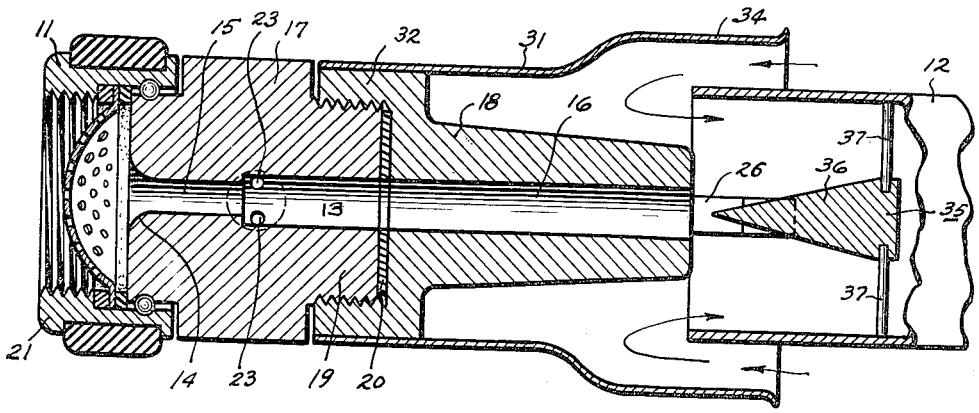
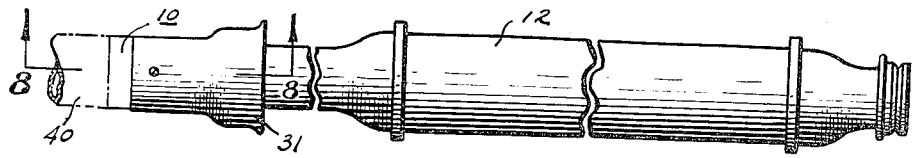
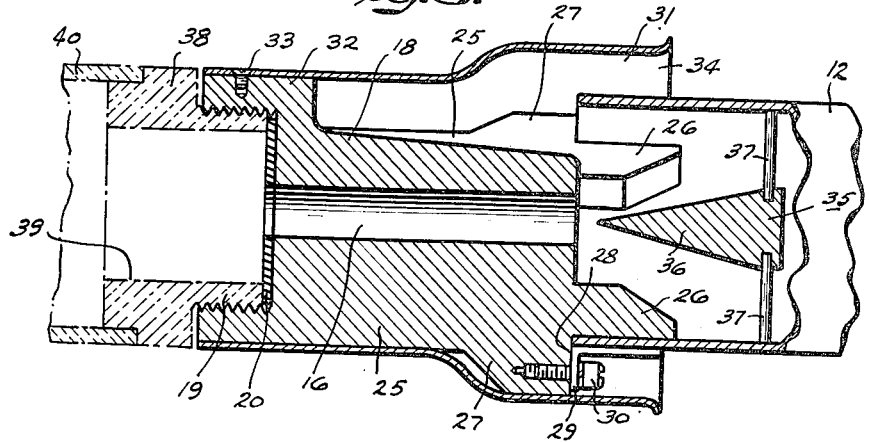
INVENTOR.
FISHER L. BOYD
BY
ATTORNEY Oct. 9, 1956
F. L. BOYD
2,766,026
FOAM DISCHARGE UNIT
Filed July 22, 1952.
3 Sheets-Sheet 3
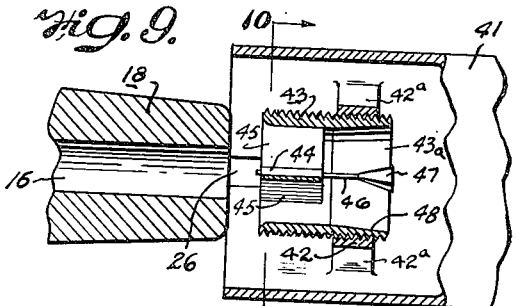
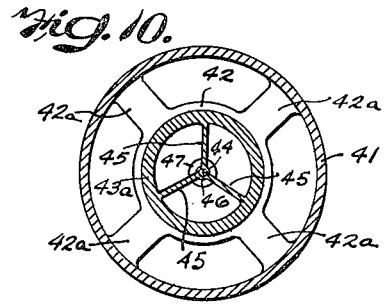
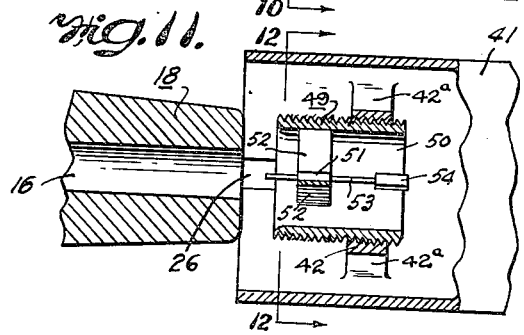
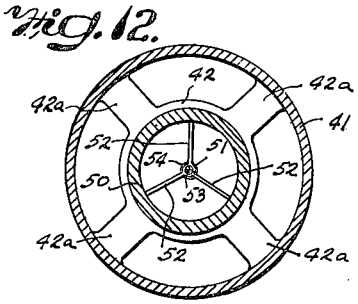
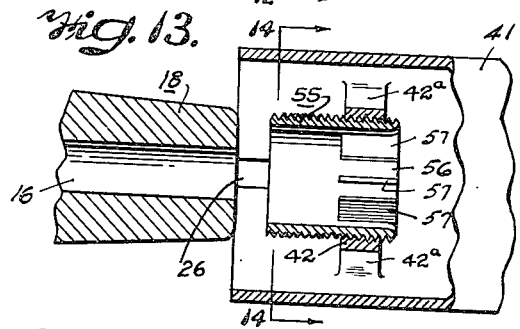
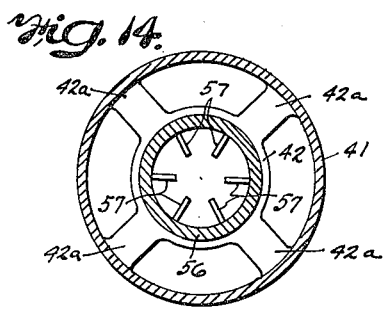
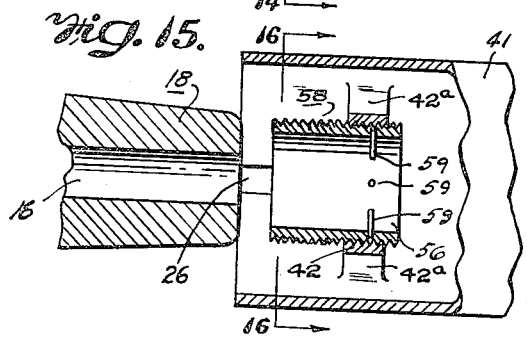
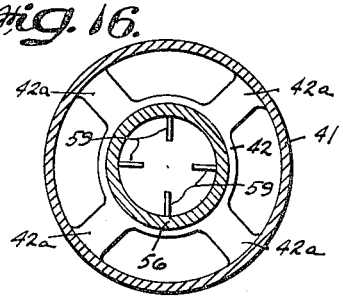
INVENTOR.
FISHER L. BOYD
BY
ATTORNEY

United States Patent Office 2,766,026
Patented Oct. 9, 1956

2,766,026

FOAM DISCHARGE UNIT

Fisher L. Boyd, West Chester, Pa., assignor to National Foam System, Inc., West Chester, Pa., a corporation of Delaware Application July 22, 1952, Serial No. 300,240

7 Claims. (Cl. 261—76)

This invention relates generally to apparatus for use in the production of mechanical or air foam employed in the extinguishment of fires and is more particularly concerned with an improved construction of the discharger for the foam-forming solution.

Among the principal objects of the present invention is to provide the nozzle of the discharger with a passage for the foam-forming solution which is less likely to clog.

Another object of the present invention is to provide a discharger having diffuser means positioned in advance of its nozzle.

Still another object of the present invention is to provide a discharger adapted to interchangeably accommodate diffuser means each affording a different discharge pattern for the foam.

And still another object of the present invention is to provide a discharger which may be conveniently converted from a pick-up to a premix type of discharger and vice versa.

Another object of this invention is to provide a discharger which is exceedingly simple in design and construction and which is comparatively simple and inexpensive to manufacture.

Other objects and advantages of the invention will be apparent more fully hereinafter, it being understood that the present invention consists substantially in the combination, construction, location and relative arrangement of parts, all as will appear more fully hereinafter, as shown in the accompanying drawings, and as finally pointed out in the appended claims.

In the accompanying drawings, which are illustrative of a preferred embodiment of the present invention:

Figure 6 is a longitudinal sectional view taken on the line 6—6 of Figure 2;

Figure 7 is a view showing the nozzle and foam discharge tube of the present invention associated with a conduit for delivering a pre-mixed foam-forming solution directly to the nozzle.

Figure 8 is a longitudinal sectional view taken on the line 8—8 of Figure 7;

Figure 9 is a longitudinal sectional view through part of a modified form of the discharger showing a diffuser assembly mounted in the discharge tube;

Figure 10 is a transverse sectional view taken on line 10—10 of Figure 9;

Figure 11 is similar to Figure 9 but shows another type of diffuser assembly;

Figure 12 is a transverse sectional view taken on line 12—12 of Figure 11;

Figure 13 is similar to Figure 9 but shows still another type of diffuser assembly;

Figure 14 is a transverse sectional view taken on line 14—14 of Figure 13;

Figure 15 is similar to Figure 9 but shows yet another type of diffuser assembly; and Figure 16 is a transverse sectional view taken on line 16—16 of Figure 15.

Figure 1:
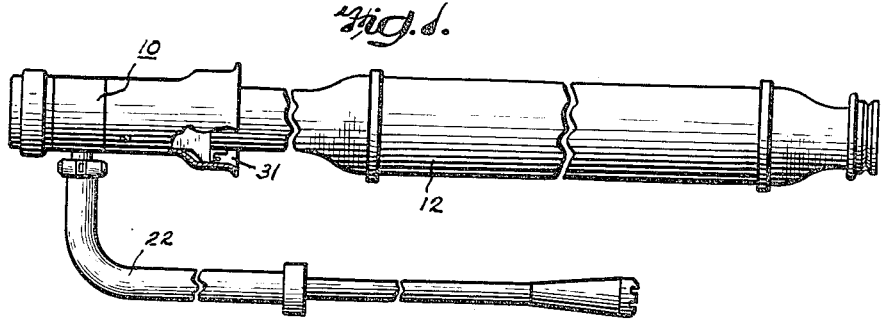
Figure 1 is a view showing one form of the nozzle and foam discharge tube of the present invention in association with a pickup tube for the foam-forming liquid which is drawn into the water stream as it passes through the nozzle.
Figure 2:
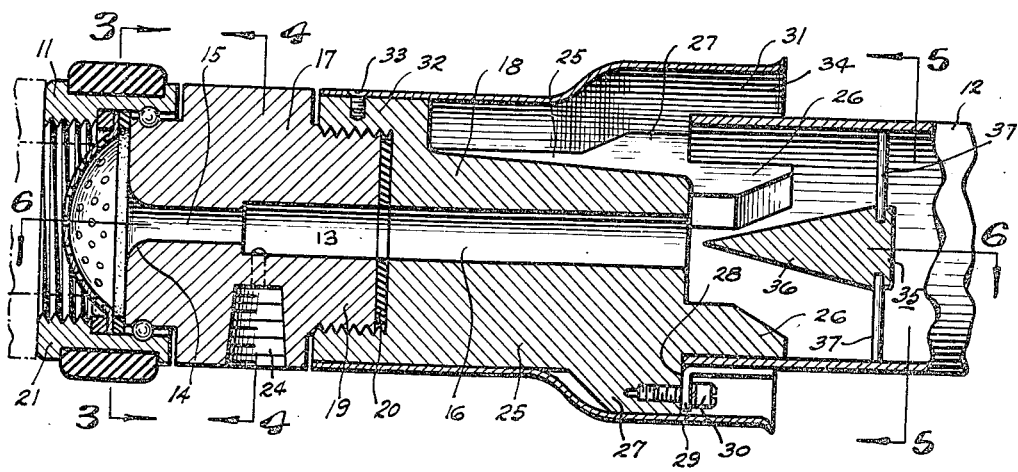
Figure 2 is a longitudinal sectional view of the nozzle unit.
Figure 3:
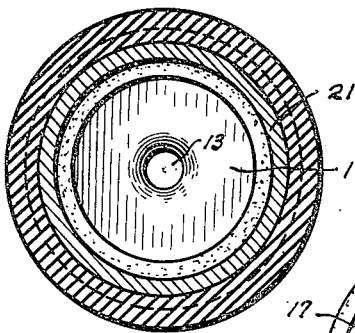
Figure 3 is a transverse sectional view taken on line 3—3 of Figure 2.
Figure 4:
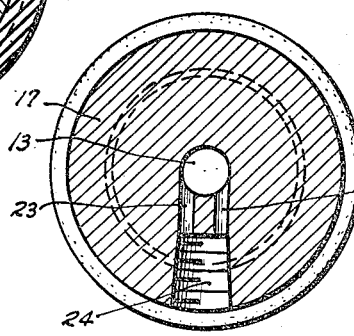
Figure 4 is a transverse sectional view taken on line 4—4 of Figure 2.

Referring now to the drawings and more particularly to Figures 1 and 2 wherein the nozzle unit of the present invention is designated generally by the reference numeral 10, it will be observed that said nozzle is adapted to be connected by means of its interiorly threaded end 11 to a conduit (not shown) through which water under suitable pressure is supplied to the nozzle for mixture with a suitable foam-forming material and air to form foam in accordance with principles well known and understood in the art, the foam so produced being discharged by way of a foam discharge tube 12 for application to the fire to be extinguished.

Referring now more particularly to Figures 2 to 6, inclusive, it will be noted that the nozzle 10 essentially consists of a main body member having a central bore 13 extending longitudinally therethrough. The rear portion of the bore 13 is outwardly flared as at 14 and communicates with a rear passage 15, which in turn communicates with a forward passage 16 of enlarged diameter. The main body member is in the form of a rearwardly disposed charging section 17 and a forwardly disposed discharging section 18, the proximate end portions of which are respectively provided with a reduced male part 19 threadedly fitted into a complementary female part 19ª, a gasket member 20 being suitably disposed therebetween. It will be noted that the change in diameter between passages 15 and 16 occurs intermediate the ends of charging section 17 and that the gasket 20 is provided with a central opening which registers with the passage 16.

The rear end of the charging section 17 is externally fitted with a freely revoluble coupling member 21 by means of which the nozzle is readily connected to the conduit (not shown) leading to the source of water which is delivered thereby under suitable pressure to the nozzle for discharge therefrom by way of the bore 13.

The liquid stream passing through the passage 13 of the nozzle at high velocity induces a suction action in the region where it emerges from the restricted passage 15 of the bore 13, this suction action being utilized to draw into the water stream a suitable foam-forming agent by way of a pickup tube 22. In order to most efficiently introduce the foam-forming agent into the water stream, the charging section 17 is provided with a pair of passages 23—23 respectively extending laterally and substantially tangentially of the enlarged diameter passage 16 (see particularly Figure 4). The outer ends of these lateral passages 23—23 commonly communicate with an internally threaded opening 24 formed in the side wall of the charging section for receiving one end of the pickup tube 22 (see Figure 1) leading to the source of foam-forming material.

Figure 5:
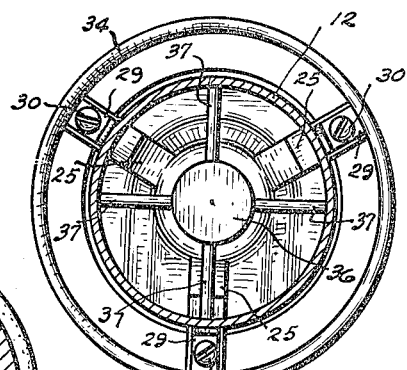
Figure 5 is a transverse sectional view taken on line 5—5 of Figure 2.

As most clearly appears in Figures 2 and 5, the discharging section 18 is externally provided with three circumferentially spaced radially extending elements 25, each having a forwardly extending portion 26 providing a seat for the inner end of the foam-discharge tube 12, this inner end being fitted snugly over and about the seat portions 26 so that it is in axial alinement with the nozzle. These tube supporting elements 25 are respectively provided with radially extending edges 28 of which are disposed substantially in the transverse plane of the terminal end of the discharging section, these edges 28 serving as abutments for the rear end of the tube. The latter is preferably provided with radially extending elements 29 through which screws 30 are projected into the edges 28 of the tube-supporting elements to fixedly secured the tube in position. It will be noted that the inner end of the tube 12 is of larger diameter than that of the proximate end of the discharging section 18, these ends of the tube and discharging section being thus maintained in spaced relation to permit the free passage of air from atmosphere into the region of the stream discharged from the nozzle.

The radially extending portions 27 of the tube-supporting elements additionally serve to center about the discharging section 18 an external shield 31, the rear end of which is snugly fitted about an annular flange 32 integrally formed upon the rear end of the discharging section 18, and in which the threaded female part 19a is formed. One or more screws 33 secure the rear end of the shield to flange 32, it being observed that the forward portion 34 of the shield is of such enlarged diameter and so extends forwardly of the discharging section 18 that it is disposed in space relation about the proximate end of the foam discharge tube. Thus, air from atmosphere is free to pass in the direction of the arrows shown in Figure 6 for entrainment with the foam-forming solution discharged from the nozzle 10 into the entrance end of the foam discharge tube 12.

For breaking up the liquid stream discharged from the nozzle 10 at high velocity, there is mounted within the discharge tube 12 in advance of the nozzle 10 diffuser means designated generally by the numeral 35. The diffuser means or assembly comprises a diffuser element 36 suitably rigidly secured to the discharge tube 12 by a plurality of rods 37. The diffuser element 36 is in the form of a cone, and the rods 37 project radially from the form of a cone, and the rods 37 project radially from equally spaced portions about the base thereof for securement to the inner surface of the discharge tube 12, the element 36 being thus disposed in coaxial relation to the discharge tube 12 and the central bore 13 of the nozzle 10, and being further disposed with its apex presented toward the latter.

It will be observed that the discharger described hereinabove and shown in Figures 1 to 6, inclusive, may be readily converted for use in connection with premixed foam-forming solution by dispensing with the pickup tube 22 and closing the opening 24 with a suitable plug (not shown), the premixed solution being delivered directly to the nozzle 10 through the conduit connected to coupling 21.

Instead of resorting to this expedient, the discharger section 18 may be provided with a single adapter unit 38 having a large central bore or passage 39 and which is adapted for securement to the discharging section 18 in lieu of the charging section 17 hereinbefore described, the rear end of the adapter 38 being adapted for connection to a conduit 40 which delivers the premixed solution directly to the nozzle 10.

The present invention is not limited to the particular diffuser means described hereinabove. It will be noted that the conical diffuser 35 shown in Figures 2, 5, 6 and 8 is permanently fixed within the foam discharge tube 12 in predetermined axially spaced relation to the discharge end of the nozzle section 18. In certain instances, however, it may be desirable to provide for limited axial adjustment of the diffuser within the foam discharge tube in which it is mounted.

Referring particularly to Figures 9 and 10, it will be observed that the nozzle 10 is shown associated with a discharge tube 41 having its end proximate the nozzle 10 disposed in embracing relation to an interiorly threaded collar 42, the latter being integrally secured to the discharge tube 41 internally thereof by a plurality of radially extending integral ribs 42a and having mounted therein a diffuser assembly designated generally by the numeral 43. This diffuser assembly comprises a sleeve 43a projected through the collar 42 and disposed thereby in coaxial relation to the discharge tube 41 and to the bore 13 of the nozzle 10, the sleeve 43a being threadedly engaged with the collar 42 for axial adjustment relative thereto. Extending through the rear portion of the sleeve 43a in coaxial relation thereto is a tubular element 44 integrally secured to the sleeve 43a by a plurality of radially extending ribs 45. Fitted tightly into the tubular central element 44 is a pin 46 generally longitudinally coextensive with the sleeve 43a and terminating forwardly in a coaxially related integral diffuser element 47 in the form of a cone, the apex of the cone being presented toward the nozzle 10. It will be observed that the internal surface of the portion of sleeve 43a proximate the diffuser element 47 is outwardly flared as at 48 to generally parallel the surface of the conically shaped diffuser element 47.

Now referring particularly to Figures 11 and 12, it will be observed that the nozzle 10 and the discharge tube 41 are shown associated with a diffuser assembly designated generally by the numeral 49. This diffuser assembly includes a sleeve 50 which is threaded into the collar 42 in the same manner as hereinabove described with regard to the sleeve 43a of Figures 9 and 10, the sleeve 50 being similarly provided with a central tubular element 51 secured in position by the radially extending ribs 52. Fitted tightly into the tubular element 51 is a pin 53 generally longitudinally coextensive with the sleeve 50 and terminating forwardly in a coaxially related integral diffuser element 54 in the form of a cylinder. It will be observed that the internal surface of the portion of sleeve 50 proximate the diffuser element 54 is not flared as in the case of the internal surface of the portion of sleeve 43a proximate the diffuser element 47, but instead is of cylindrical form to parallel the cylindrical surface of the element 54.

Referring particularly to Figures 13 and 14, it will be observed that the nozzle 10 and the discharge tube 41 are shown associated with yet another diffuser assembly designated generally by the numeral 55. This diffuser assembly comprises a sleeve 56 projected through the collar 42 in the same manner as hereinabove described with regard to the sleeve 43a. However, instead of a single centrally disposed diffuser element, the sleeve 56 is provided with a plurality of internal webs 57 which are spaced equally about the inner surface of the forward end portion of the sleeve and project radially inward of said surface to points spaced equidistantly from the center of the sleeve, as best shown in Figure 14.

Now referring particularly to Figures 15 and 16, it will be observed that the nozzle 10 and the discharge tube 41 are shown associated with still another diffuser assembly designated generally by the numeral 58. This diffuser assembly is similar to the diffuser assembly 55 except that the diffuser elements are in the form of pins 59 instead of webs 57.

It will be apparent that the nozzle 10 of the present invention may be furnished with the charging section 17 and/or the adapter 38, according to requirements. This makes it unnecessary for the manufacturer to keep on hand complete nozzle units for each type of operation, because whether the nozzle is to be part of a pickup type discharger or part of a premix type of discharger the discharge section 18 thereof is utilized and manufacturing and inventory problems are reduced accordingly.

It will be apparent, also, that either the discharge tube 12 or the discharge tube 41 may be employed in conjunction with the nozzle 10 in any of its forms described hereinbefore. Of course, when the discharge tube 12 is utilized, the liquid stream discharged from the nozzle 10 is diffused according to an invariable pattern because the diffuser assembly 35 is fixedly carried by the discharge tube 12. However, when the discharge tube 41 is utilized, the sleeve mounted in the collar 42 may be axially adjusted to suitably space the diffuser element or elements associated therewith relative to the nozzle 10, the pattern of the liquid stream being varied accordingly. In addition, it will be apparent that any combination of the diffuser assemblies 43, 49, 55 or 58 may be furnished for interchangeable use with the discharge tube 41, each being inherently capable of affording a different type of discharge pattern.

The liquid which passes through the bore 13 of the nozzle 10 issues therefrom in a solid jet form at high velocity, and it should be noted that the passages 15, 16 and 39 are entirely unobstructed and clear for passage of the liquid therethrough, the unobstructed condition of the passages 15, 16 and 39 minimizing the danger of clogging. As the solid jet issues from the nozzle 10 it impinges upon the diffuser means and is broken up in accordance with the pattern afforded by the particular type of diffuser means in use. In all of the arrangements shown, as the stream of the foam-forming solution impinges the diffusing element or elements, the stream is expended outwardly from its center and wipes along the internal surface of the foam discharge tube, in consequence of which it creates a suction within the rear end of the tube which draws air from atmosphere into the stream to form the desired foam, the discharge pattern and extent of projection of which vary accordingly as the diffuser element is changed or adjusted.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an apparatus for producing fire extinguishing foam, a discharger for foam-forming solution including an elongated main body provided with an unobstructed through passage for said solution extending from its upstream end along the longitudinal axis thereof, each part of which passage has a cross sectional area at least equal to the effective cross sectional area of the upstream end portion of said passage, a foam discharge conduit mounted directly upon and extending in longitudinal continuation of said solution discharger body, and a solution diffusing assembly mounted in said foam discharge conduit downstream of said solution discharger body in the immediate region of an opening placing the interior of said foam discharge conduit in communication with atmosphere, said diffuser assembly being disposed to effectively diffuse within said conduit the foam-forming solution issuing from said unobstructed passage into said conduit whereby to facilitate entrainment of air from atmosphere in said solution to form foam in said conduit, said diffuser assembly including a sleeve member adjustably mounted in the foam discharge conduit in substantial axial alignment with said solution passage for shifting movement axially of said conduit toward and away from the discharge end of the solution passage through said solution discharger body, and diffuser means mounted within said sleeve member for breaking up the solution stream discharged from the passage through said solution discharger body.

2. In an apparatus for producing fire extinguishing foam, a discharger for foam-forming solution including an elongated main body provided with an unobstructed through passage for said solution extending from its upstream end along the longitudinal axis thereof, each part of which passage has a cross sectional area at least equal to the effective cross sectional area of the upstream end portion of said passage, a foam discharge conduit mounted directly upon and extending in longitudinal continuation of said solution discharger body, and a solution diffusing assembly mounted in said foam discharge conduit downstream of said solution discharger body in the immediate region of an opening placing the interior of said foam discharge conduit in communication with atmosphere, said diffuser assembly being disposed to effectively diffuse within said conduit the foam-forming solution issuing from said unobstructed passage into said conduit whereby to facilitate entrainment of air from atmosphere in said solution to form foam in said conduit, said diffuser assembly including a sleeve member mounted in the foam discharge conduit for shifting movement axially of said conduit toward and away from the discharge end of the solution passage through said solution discharger body, and diffuser means mounted within said sleeve member in axial alinement with the passage through said solution discharger body, said diffuser means being in the form of a cone shaped element disposed at the downstream end of said sleeve with its apex presenting upstream.

3. In an apparatus for producing fire extinguishing foam, a discharger for foam-forming solution including an elongated main body provided with an unobstructed through passage for said solution extending from its upstream end along the longitudinal axis thereof, each part of which passage has a cross sectional area at least equal to the effective cross sectional area of the upstream end portion of said passage, a foam discharge conduit mounted directly upon and extending in longitudinal continuation of said solution discharger body, and a solution diffusing assembly mounted in said foam discharge conduit downstream of said solution discharger body in the immediate region of an opening placing the interior of said foam discharge conduit in communication with atmosphere, said diffuser assembly being disposed to effectively diffuse within said conduit the foam-forming solution issuing from said unobstructed passage into said conduit whereby to facilitate entrainment of air from atmosphere in said solution to form foam in said conduit, said diffuser assembly including a sleeve member mounted in the foam discharge conduit for shifting movement axially of said conduit toward and away from the discharge end of the solution passage through said solution discharger body, and diffuser means mounted within said sleeve member in axial alinement with the passage through said solution discharger body, said diffuser means being in the form of a cone shaped element disposed at the downstream end of said sleeve with its apex presenting upstream, while the internal surface of said sleeve member immediately embracing said diffuser element is flared to generally parallel the conical surface of said diffuser element.

4. In an apparatus for producing fire extinguishing foam, a discharger for foam-forming solution including an elongated main body provided with an unobstructed through passage for said solution extending from its upstream end along the longitudinal axis thereof, each part of which passage has a cross sectional area at least equal to the effective cross sectional area of the upstream end portion of said passage, a foam discharge conduit mounted directly upon and extending in longitudinal continuation of said solution discharger body, and a solution diffusing assembly mounted in said foam discharge conduit downstream of said solution discharger body in the immediate region of an opening placing the interior of said foam discharge conduit in communication with atmosphere, said diffuser assembly being disposed to effectively diffuse within said conduit the foam-forming solution issuing from said unobstructed passage into said conduit whereby to facilitate entrainment of air from atmosphere in said solution to form foam in said conduit, said diffuser assembly including a sleeve member adjustably mounted in the foam discharge conduit in substantial axial alignment with said solution passage for shifting movement axially of said conduit toward and away from the discharge end of the solution passage through said solution discharger body, and diffuser means mounted within said sleeve member for breaking up the solution stream discharged from the passage through said solution discharger body, said diffuser means being in the form of a cylindrical element disposed substantially concentrically within said axially movable sleeve at the downstream end of the latter.

5. In an apparatus for producing fire extinguishing foam, a discharger for foam-forming solution including an elongated main body provided with an unobstructed through passage for said solution extending from its upstream end along the longitudinal axis thereof, each part of which passage has a cross sectional area at least equal to the effective cross sectional area of the upstream end portion of said passage, a foam discharge conduit mounted directly upon and extending in longitudinal continuation of said solution discharger body, and a solution diffusing assembly mounted in said foam discharge conduit downstream of said solution discharger body in the immediate region of an opening placing the interior of said foam discharge conduit in communication with atmosphere, said diffuser assembly being disposed to effectively diffuse within said conduit the foam-forming solution issuing from said unobstructed passage into said conduit whereby to facilitate entrainment of air from atmosphere in said solution to form foam in said conduit, said diffuser assembly including a sleeve member adjustably mounted in the foam discharge conduit in substantial axial alignment with said solution passage for shifting movement axially of said conduit toward and away from the discharge end of the solution passage through said solution discharger body, and diffuser means mounted within said sleeve member for breaking up the solution stream discharged from the passage through said solution discharger body, said diffuser means being in the form of a plurality of elements spaced circumferentially about and projecting radially inward of the downstream end of said sleeve member.

6. In an apparatus of the character defined in claim 5 wherein said last-mentioned diffuser means comprise a plurality of flat plate elements respectively disposed in planes intersecting the longitudinal axis of said sleeve member with each of said elements terminating short of said axis to provide an unobstructed central passage therethrough for the foam-forming solution delivered into the foam discharge conduit.

7. In an apparatus of the character defined in claim 5 wherein said last-mentioned diffuser means comprise a plurality of rod-like elements disposed in a common plane extending normal to the axis of said sleeve member with each of said elements terminating short of said axis to provide an unobstructed central passage therethrough for the foam-forming solution delivered into the foam discharge conduit.

References Cited in the file of this patent

UNITED STATES PATENTS

| | | |
|---|---|---|
| 718,683 | Wiedenmayer | Jan. 20, 1903 |
| 1,120,129 | Cable | Dec. 8, 1914 |
| 2,183,561 | Hamblin | Dec. 19, 1939 |
| 2,373,009 | Bedford | Apr. 3, 1945 |
| 2,513,417 | Lindsay | July 4, 1950 |
| 2,562,096 | Hermann | July 24, 1951 |
| 2,597,913 | Webster | May 27, 1952 |
| 2,645,292 | Williams | July 14, 1953 |
| 2,695,069 | Boerner | Nov. 23, 1954 |

FOREIGN PATENTS

| | | |
|---|---|---|
| 125,809 | Great Britain | May 1, 1919 |
| 197,499 | Great Britain | May 17, 1923 |
| 1,000,443 | France | Oct. 10, 1951 |